Aug. 8, 1939.　　　　　J. PAGE　　　　　2,168,803
METHOD AND APPARATUS FOR MANUFACTURING WALLBOARD
Filed Oct. 23, 1937　　　2 Sheets-Sheet 1
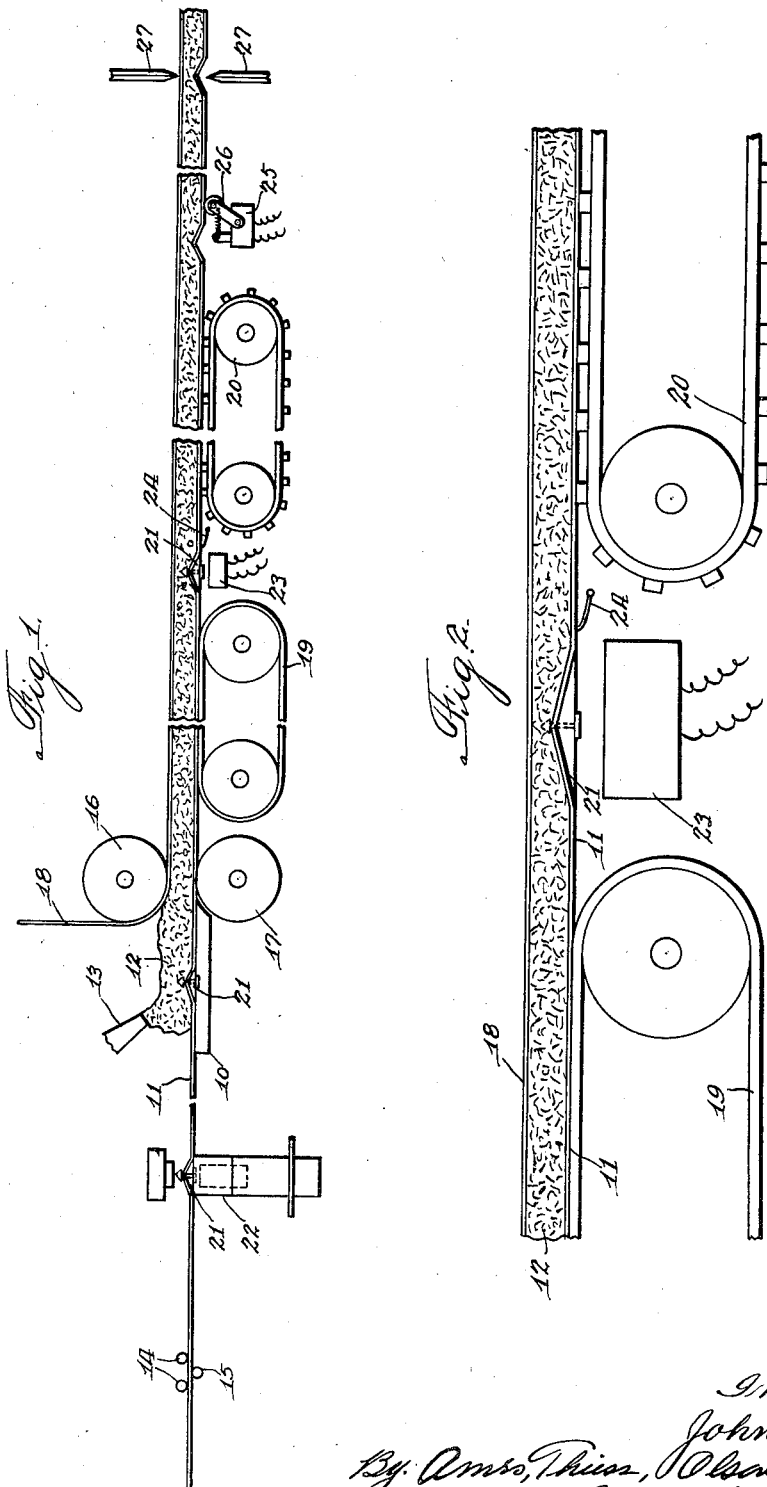
Inventor
John Page.
By Ambo, Thiess, Olson &
Mecklenburger, Attys.

Aug. 8, 1939. J. PAGE 2,168,803
METHOD AND APPARATUS FOR MANUFACTURING WALLBOARD
Filed Oct. 23, 1937 2 Sheets-Sheet 2

Inventor
John Page
By Amto, Thiess, Olan & Mecklenburger
Attys.

Patented Aug. 8, 1939

2,168,803

UNITED STATES PATENT OFFICE 2,168,803

METHOD AND APPARATUS FOR MANUFACTURING WALLBOARD

John Page, Evanston, Ill., assignor to United States Gypsum Company, Chicago, Ill., a corporation of Illinois Application October 23, 1937, Serial No. 170,510

11 Claims. (Cl. 154—2)

This invention relates to continuous molding processes and apparatus, more particularly to methods and apparatus for forming wallboards such as plaster board and the like, and has for an object the provision of a simple and reliable method and apparatus of this character.

The manufacture, in a continuous stream or sheet, of wallboard of the type comprising a composition core surrounded by fibrous or paper liners, is of course well known. It is likewise well known to provide such wallboard with a continuous beveled or recessed edge by depressing the edges of the board during the continuous forming operation. The particular advantage of wallboard having beveled or recessed edges is found in the fact that the formation of a more perfect joint between adjacent boards when the boards are assembled in a wall structure, is facilitated.

The same advantages are, of course, found in wallboard having the ends as well as the longitudinal edges beveled or recessed, but considerably more difficulty is encountered in providing recessed ends when the wallboard is manufactured in a continuous stream or sheet as indicated above. In the production of recessed-end boards it is important that an accurate bevel or recess be provided so that a joining tape can be embedded in cement in the depression between adjacent boards to form a flat surfaced joint. If the surface of one bevel or recess is higher on one board than on the adjacent board, a ridge will, of course, be formed, and due to uneven shrinkage of the cement used in filling the recessed area, this ridge may show in the finished joint.

Attempts have heretofore been made to provide recessed or beveled-end boards by means of a continuous manufacturing process, but so far as I am aware these attempts have not been entirely satisfactory. Accordingly, it is a further object of this invention to provide an improved continuous method of manufacture for forming recessed-end wallboards, and to provide a simple and reliable apparatus for carrying out this improved method.

In carrying out the invention in one form, a conventional board-forming machine is employed for advancing a plastic mass or core between top and bottom fibrous covered sheets to form a board of predetermined thickness, and transversely extending supporting members are secured to the outer surface of the bottom cover sheet prior to the application of the plastic mass or core, which supporting members form spaced depressions in one surface of the formed board as it passes through the board-forming machine. After the plastic mass or core has set, the supporting members are removed and the formed board is severed along the transverse depressions to form wallboards having uniformly recessed ends.

For a more complete understanding of this invention reference should now be had to the drawings, in which:

Figure 1 is a somewhat diagrammatic representation of a preferred form of apparatus for forming recessed-end wallboards in accordance with this invention;

Fig. 2 is an enlarged fragmentary view of a portion of the apparatus shown in Fig. 1;

Figure 3:
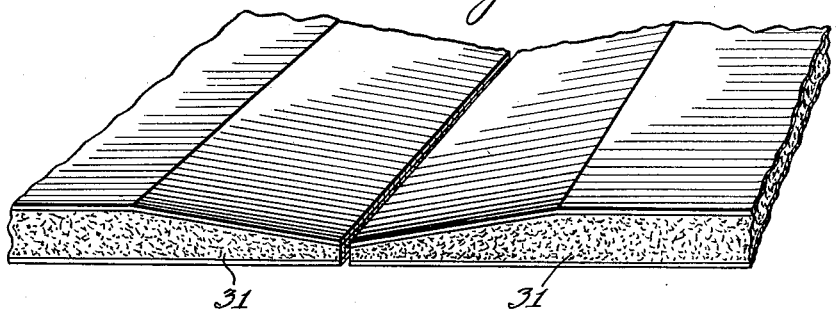
Fig. 3 is a fragmentary perspective view of a pair of recessed-end wallboards formed in accordance with this invention.

Referring now to Fig. 1 of the drawings, I have shown my invention as applied to a conventional board-forming apparatus which comprises a forming table or support 10 over which the bottom cover sheet or fibrous liner 11 is continuously passed for receiving a plastic mass 12. This plastic mass is preferably gypsum plaster or other suitable composition material in its plastic or manageable state, and is deposited on the bottom cover sheet 11 from any suitable source, as for example the delivery spout 13. It will of course be understood that the bottom cover sheet 11 is supplied from a suitable supply roll and preferably passes through a plurality of tension rollers 14 and 15.

Adjacent one side of the forming table 10 is a pair of forming rolls 16 and 17 which operate on the plastic mass to form a continuous board stream of desired thickness, the upper one of the forming rolls 16 being arranged to apply to the upper surface of the formed board a top cover sheet or fibrous liner 18. From the forming rolls 16 and 17 the formed board passes over a suitable setting conveyor 19 which supports the board for a sufficient interval of time to permit the plastic mass or core 12 to set, and the board thereafter passes over a suitable slat conveyor 20 and is subsequently severed along transverse lines to provide boards of predetermined length, which boards are then subjected to a suitable drying and hardening treatment.

The apparatus thus far described is entirely conventional, and in order to provide recessed-end boards, in accordance with this invention, means are provided for securing to the bottom cover sheet 11, before the plastic mass 12 is applied thereto, a plurality of transversely extending supporting members or ridges, such for example as the members 21. These supporting members may of course be secured to the lower surface of the cover sheet 11 in any desired manner, but I prefer to employ suitable staples or fasteners which penetrate the cover sheet 11. Thus, in Fig. 1, I have shown somewhat diagrammatically a stapling machine 22 disposed adjacent the supporting table 10, for applying the supporting members 21 to the cover sheet 11 at predetermined intervals before the plastic mass 12 is applied to the cover sheet 11.

Figure 5:
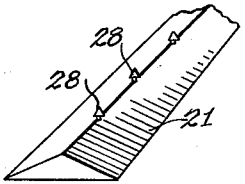
Figs. 5, 6, and 7 are, respectively, fragmentary perspective views of various forms of supporting members that may be utilized in carrying out this invention.
Figure 6:
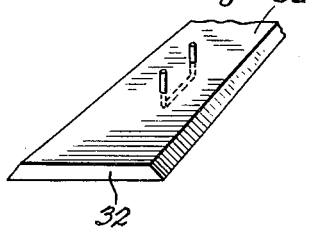
Figure 7:
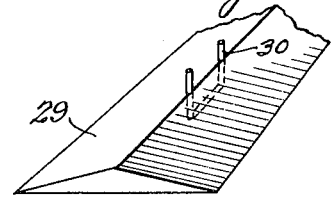

The supporting members 21 may be formed of any suitable material such as paper, fiber, or wood, and may constitute either a series of pegs or buttons spaced at intervals across the cover sheet 11, although I prefer to provide continuous strips, for example, of the type shown in Figs. 5, 6, and 7. Preferably, a paper strip is employed because of its ease of application to the cover sheet 11 by means of a conventional stapling mechanism including a feed roll, a cut-off mechanism, and a stapling device which may be properly correlated to the rate of travel of the cover sheet 11.

It is important that the supporting members or inserts 21 be sufficiently rigid to withstand the compression force exerted thereon, and although such devices are not shown in the drawings, it will be understood that the board-forming machine may include suitable smoothing and ironing devices following the forming rolls 17, and in some cases a vibrator may be employed under the bottom cover sheet in front of the forming rolls.

It will now be apparent that the supporting members 21 are effective to support portions of the bottom cover sheet 11 and the plastic core 12 away from the forming table and the setting conveyor 19 so as to provide uniform recesses in the formed board at spaced intervals. As stated above, the formed board is supported on the conveyor 19 until after the core has set, and in accordance with this invention the inserts 21 are then removed from the cover sheet 11 and the formed board is severed along the center lines of the depressions so as to provide recessed-end boards of predetermined length.

Although any suitable means may be provided for removing the inserts 21, I have shown, for purposes of illustration, a magnetic device 23 which is disposed adjacent the rear end of the conveyor 19 and energized from any suitable source of electric energy so as to effect the withdrawal of the magnetizable fasteners or stapling members utilized in securing the supports 21 to the cover sheet 11. If non-magnetizable fastening means or adhesive is used to secure the supporting members 21 to the bottom cover sheet 11, suitable other means may be provided for removing the supporting members, and in Fig. 2 I have shown a stripping device 24 which constitutes a stiff leaf spring adapted to engage the supporting members 21 and remove them from the recesses formed in the continuous sheet of plaster board. This stripping device 24 may of course be employed either in conjunction with the magnet 23 or separately.

After the supporting members or inserts 21 have been removed from the recesses, it is desirable to sever the continuous sheet of plaster board along the center lines of the recesses. This may be accomplished by synchronizing the cut-off mechanism with the forming rolls 16 and 17 and the conveyors 19 and 20 in any suitable manner, but in order to insure accurate cutting of the sheets I prefer to utilize the recesses themselves properly to synchronize the cut-off mechanism. Thus, in Fig. 1 I have shown somewhat diagrammatically a tripping switch 25 which is controlled by a movable arm 26 and which in turn controls through suitable mechanism, not shown, a pair of cut-off knives 27. Normally, the switch 25 is retained in its open position with the arm 26 engaging the lower surface of the formed board, and it will be apparent that each time the arm 26 moves upwardly into a recess in the bottom surface of the board the switch 25 will be closed, closure of the switch being effective to operate the cut-off mechanism. The switch 25 and the cut-off knives 27 are so spaced from each other that one of the recesses in the formed board is directly between the knives 27 whenever the next succeeding recess is in position to permit closure of the switch 25.

The shape and depth of the recesses formed in the continuous board sheet, and accordingly the ultimate shape of the recessed ends of the plaster boards, may of course be varied by utilizing properly formed supporting members or inserts 21. In Figs. 1 and 2 I have shown a substantially triangular supporting strip such as is shown more in detail in Figs. 5 and 7, the strip 21 being provided with suitable projections 28 arranged to pierce the cover sheet 11. If desired, this supporting member 21 may be of somewhat flatter configuration, as indicated for example by the supporting strip 29 shown in Fig. 7, and double-prong staples 30 may be utilized to secure a supporting strip to the cover sheet.

Figure 4:
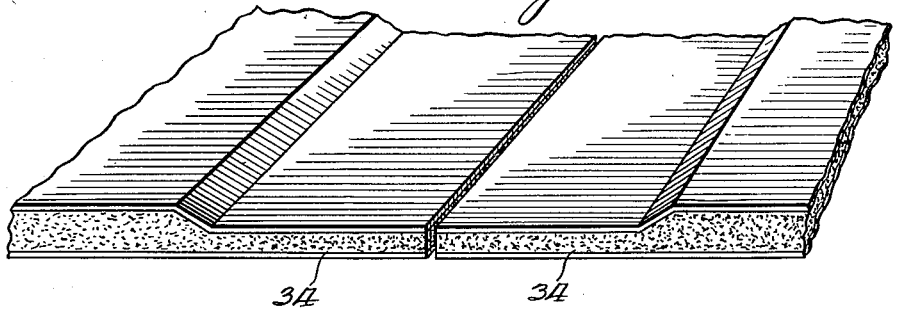
Fig. 4 is a similar fragmentary perspective view of a pair of wallboards provided with a different type of recess in the ends thereof.

When triangular supporting members of this type are employed, it is necessary that the operation of the cutting knives 27 be controlled with extreme accuracy so as to insure that the boards are severed along the center lines of the triangular depressions to form beveled-end boards such as indicated by the reference numeral 31 in Fig. 3. In order to obviate the necessity for such extreme accuracy in controlling the cutting knives, it may be preferable to utilize an insert 32 formed as shown in Fig. 6, which insert has a flat face 33 so that the base of each of the depressions formed in the board extends substantially parallel to the surfaces of the board. Thus, when the continuous board strip is severed along or approximately adjacent the center line of the depressions, recessed-end boards of the type indicated by the reference numerals 34 in Fig. 4 will be formed. It will be apparent that the point of severance may vary considerably with boards of this type without seriously affecting the shape of the recessed ends.

While I have shown an arrangement in which the supporting members or inserts are secured to the bottom cover sheet before the plastic mass 12 is applied thereto, it will of course be apparent that these inserts may be applied after application of the plastic mass and before the cover sheets and the plastic mass pass through the forming rolls. Likewise, it will be apparent that the inserts or supporting members may be applied to the bottom cover sheet after passage through the forming rolls and before the board begins its passage over the setting conveyors 19. This latter arrangement, although within the scope of my invention, is not considered as satisfactory as the preferred embodiments hereinbefore described, due to the fact that bumps or deformation of the plastic mass or core may result.

In the drawings, the dimensional cross section of the supporting members or strips, and accordingly the resulting size of the recesses in the formed board, have been considerably exaggerated in order to facilitate an understanding of this invention. While the recess or bevel may be of any size or shape desired, a satisfactory recessed-end wallboard may be provided by forming the recess about .03 inch deep and about 1½ inches wide on each side of the center or cutting mark.

Although the invention has been described in connection with a board-forming machine for forming open or raw-edged plaster board, it will of course be understand that the invention is equally applicable to processes and apparatus for forming closed-edge wallboard in which the bottom cover sheet is folded over the plastic mass or core so as to entirely enclose the core within the fibrous liners. Means for forming plaster board of this type are well known in the art, and it is not thought necessary to describe such apparatus in detail. It will likewise be understood that the invention may be practiced, as described above, independently of whether or not the board-forming apparatus includes means for beveling or recessing the side or marginal edges of the continuous board sheet as it passes therethrough.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desired to secure by Letters Patent is:

1. The method of forming recessed-end plasterboards which comprises securing to the outer surface of a fibrous cover sheet at spaced intervals supporting members extending transversely of said sheet, applying a plastic mass and a second fibrous cover sheet to said first cover sheet, forming the plastic mass between said sheets to a desired thickness, said supporting members during said forming operation supporting said first cover sheet so as to form spaced depressions in one surface of the formed board, supporting said formed board and said supporting members until said plastic mass has set thereafter removing said supporting members, and severing the cover sheets and the set mass along said transverse depressions.

2. The method of forming recessed-end plasterboards which comprises securing a plurality of transversely extending supporting members to the outer surface of a bottom cover sheet at spaced intervals, applying a plastic mass and a top cover sheet to said bottom cover sheet, forming the plastic mass between said sheets to a desired thickness, said supporting members during said forming operation supporting said bottom cover sheet so as to form uniform transverse depressions in said bottom cover sheet and said plastic mass, removing said supporting members from said depressions after said plastic mass has set, and severing said cover sheet and said set mass along the center-lines of said transverse depressions to form recessed-end plasterboards.

3. In a continuous process of forming plasterboards having inner and outer covering sheets with a composition core therebetween, the steps which consist of securing to the outer surface of one of said covering sheets before the board is formed a plurality of transversely extending supporting members, forming said board to a uniform thickness to press said supporting members into said board and form transversely extending depressions in one surface thereof, removing said supporting member after the composition core has set, and severing the cover sheets and the core along the center-lines of said depressions.

4. In a continuous process of forming plasterboards having top and bottom covering sheets with a plaster core therebetween, the steps which consist of securing a plurality of supporting members to the outer surface of the bottom covering sheet before the board is formed, forming said board to a predetermined thickness to force said supporting members into said board and form uniform, spaced depressions in one surface thereof, supporting said board and said members until said plaster core has set, removing said supporting members, and severing the cover sheets and the core along the center-lines of said depressions to form depressed-end boards.

5. In a wallboard apparatus including means for advancing a plastic mass between cover sheets of fibrous material and board-forming means for operating on said cover sheets with the plastic mass therebetween to form a product of desired thickness, the combination of means for securing transversely extending supporting members to the outer surface of one of said cover sheets at spaced intervals before said cover sheets and said plastic mass are advanced to said board-forming means whereby said supporting members upon engaging said board-forming means form transversely extending depressions in one surface of the formed board, means for removing said supporting members after said plastic mass has set, and means for severing said cover sheets and said set mass along said transverse depressions to form recessed-end board.

6. In a wallboard apparatus including means for advancing a plastic mass between cover sheets of fibrous material and board-forming means for operating on said cover sheets with the plastic mass therebetween to form a product of desired thickness, the combination of means for securing transversely extending supporting members to the outer surface of one of said cover sheets at spaced intervals before said cover sheets and said plastic mass are advanced to said board-forming means whereby said supporting members form transversely extending depressions in one surface of the formed board, conveyor means for supporting said formed board and said supporting members until said plastic mass has set, means for removing said supporting members from said depressions, and means for severing said cover sheets and said set mass along the center-lines of said depressions to form recessed-end boards.

7. In an apparatus for manufacturing recessed-end wallboards, the combination of means for advancing a plastic mass between cover sheets of fibrous material, means for securing to the outer surface of one of said cover sheets a plurality of uniformly spaced supporting members, board-forming means for engaging said cover sheets with the plastic mass therebetween to form a board of desired thickness, said supporting members forming depressions in said one cover sheet and said plastic mass, mean for supporting said formed board until said plastic mass has set, means for thereafter removing said supporting members, and means for serving said formed board at said depressions to form recessed-end boards.

8. In an apparatus for manufacturing recessed-end wallboards, the combination of means for advancing a plastic mass between cover sheets of fibrous material, means for securing to the outer surface of one of said cover sheets a plurality of transversely extending supporting strips having flat faces engaging said cover sheet, board-forming means for engaging said cover sheets with the plastic mass therebetween to form a board of predetermined thickness, said supporting strips forming depressions in said one cover sheet and said plastic mass, the base of each depression being substantially parallel to the surfaces of said board, means for supporting said formed board until said plastic mass has set, means for thereafter removing said supporting strips, and means for severing said cover sheets and said sets mass along the center-line of said depressions to form recessed-end boards.

9. In an apparatus for forming recessed-end wallboards, the combination of means for advancing and forming a plastic mass between cover sheets of fibrous material, means for securing to one of said cover sheets before application of said plastic mass a plurality of spaced supporting members for engaging said advancing and forming means to form uniform spaced depressions in said one cover sheet and said plastic mass, means for removing said supporting members from said depressions after said plastic mass has set, and means for severing selected lengths of the formed board along said depressions to form recessed-end wallboards.

10. In a continuous process of forming plasterboards having inner and outer cover sheets with a composition core therebetween, the steps which consist of securing to the outer surface of one of the cover sheets a plurality of transversely extending supporting members, forming said core between said sheets to a predetermined thickness to cause said supporting members to indent said one cover sheet whereby said board is formed with transversely extending depressions in one surface thereof, supporting said formed board and said supporting members until said core has set, removing said supporting members, and severing said cover sheets and said set core along the center-lines of said depressions.

11. In a wallboard apparatus including means for advancing a plastic mass between cover sheets of fibrous material and board-forming means for operating on said cover sheets with the plastic mass therebetween to form a product of desired thickness, the combination of means for securing transversely extending supporting members to the outer surface of one of said cover sheets at spaced intervals to engage said board-forming means and form transversely extending depressions in one surface of the formed board, conveyor means for supporting said formed board and said members, until said plastic mass has set, means for removing said members from said depressions, and means for severing said cover sheets and said set mass along the center-lines of said depressions to form recessed-end boards.

JOHN PAGE.